United States Patent [19]

Corey et al.

[11] Patent Number: 5,052,713
[45] Date of Patent: Oct. 1, 1991

[54] VEHICLE SUSPENSION SAFETY SYSTEM

[75] Inventors: Jeffrey S. Corey; Michael A. Miles, both of Lufkin, Tex.

[73] Assignee: Lufkin Industries, Inc., Lufkin, Tex.

[21] Appl. No.: 564,271

[22] Filed: Aug. 6, 1990

[51] Int. Cl.$^5$ ............................................. B60G 11/26
[52] U.S. Cl. .................................. 280/711; 280/683; 280/704; 280/707; 280/714
[58] Field of Search ............... 280/678, 711, 713, 680, 280/707, 704, 683, 714; 180/24.02, 290, 209

[56] References Cited

U.S. PATENT DOCUMENTS

| | | | |
|---|---|---|---|
| 2,777,529 | 1/1957 | Harbers | 180/22 |
| 3,201,141 | 8/1965 | Bernstein et al. | 280/104.5 |
| 3,224,522 | 12/1915 | Fleming et al. | 180/22 |
| 3,441,102 | 4/1969 | Kress | 180/22 |
| 3,494,632 | 2/1970 | Bostrom | 280/104.5 |
| 3,499,663 | 3/1970 | Hedlund et al. | 280/124 |
| 3,877,715 | 4/1975 | Thayer et al. | 280/81 A |
| 4,141,430 | 2/1979 | Eddy, Jr. | 180/105 E |
| 4,284,156 | 8/1981 | Carstensen | 180/24.02 |
| 4,341,398 | 7/1982 | Condon et al. | 280/711 |
| 4,359,716 | 11/1982 | Miyamaru et al. | 340/60 |
| 4,558,886 | 12/1985 | Straub | 280/711 |
| 4,740,005 | 4/1988 | Babin | 280/711 |
| 4,854,409 | 8/1989 | Hillebrand et al. | 180/24.02 |
| 4,856,812 | 8/1989 | Stephens et al. | 280/711 |
| 4,903,209 | 2/1990 | Kaneko | 280/707 |
| 4,934,731 | 6/1990 | Hiwatashi | 280/711 |

Primary Examiner—Kenneth R. Rice

[57] ABSTRACT

Apparatus and process for shifting vehicle loads between the axles of multi-axle vehicles. The apparatus includes means for automatically restoring pneumatic pressure to the suspension system of an axle when the speed of the vehicle exceeds a predetermined speed. The apparatus also includes means for automatically exhausting the pneumatic pressure if the speed of the vehicle falls below the predetermined speed within a predetermined time from actuating the device. The process includes the steps of automatically restoring pressure to the pneumatic suspension system of a dead axle when a predetermined speed has been exceeded, and again exhausting the pressure if a fall in vehicle speed below the predetermined speed occurs within a specified time. An override in both the apparatus and method prevents exhaustion of the pneumatic pressure after a predetermined time from first exhausting the pressure.

4 Claims, 2 Drawing Sheets

VEHICLE SUSPENSION SAFETY SYSTEM

FIELD OF THE INVENTION

This invention relates to multi-axle vehicles having pneumatic suspension systems for each axle.

BACKGROUND OF THE INVENTION

The use of multi-axle tractor-trailers and other multi-axle vehicles in this and other countries has increased markedly over the past years. As trailers have been designed to carry heavier loads, axles have been spread wider apart on the trailers to conform with Federal and State bridge laws and the loadings permitted thereunder. The suspension systems for multi-axle trailers quite frequently include pneumatic, or "air bag" elements which cushion the shocks when pressured and permit rapid pressure release to remove the load from one of the axles when turning. If the pneumatic pressure is not exhausted from one or more of the several (only one of a two-axle trailer) axles, maneuverability of the trailer is lessened when approaching a loading dock, and torque is exerted on the trailer frame by the resistance to turning of the two axles, each of which have four tires in contact with the road surface. The greater the distance between the two axles, the greater the torque becomes. Sometimes spacing between axles is greater that ten feet.

The problem of torque in tight turns was overcome by raising all but one axle, thereby taking the load off all but one axle. In the case of air bag suspensions, the load is released by exhausting the air from the bags on all but one axle. In that way, maneuverability of the trailer is improved when the trailer is maneuvering at low speeds within a loading dock area or the like or during tight turns.

However, another problem has remained unsolved in such load-shifting devices. Operators may forget that they have shifted the load to only one axle, drive out of the truck yard and attain highway speed without re-inflating the air bags on the remaining axle or axles of the trailer. The overloading of a single axle in this manner can result in damage to the trailer frame and if extreme dynamic loading is experienced at highway speed. Tire wear is increased and braking capacity is decreased with an overloaded axle. Additionally, Federal and State laws govern the axle loads which may safely traverse bridges and certain highways. With all the trailer load on a single axle, these limits may well be exceeded. Therefore, it has become an important matter to make sure that loads are properly disributed on the multi-axle vehicles after loading and maneuvering operations are completed.

SUMMARY OF THE INVENTION

The apparatus of the invention includes means responsive to the speed of a vehicle for automatically restoring and then exhausting pneumatic pressure in the suspension system of a multi-axle vehicle which had been depressured for tight turning. The invention also includes means for automatically restoring the pressure to the suspension system after the passage of a predetermined time from initial depressuring.

The method of the invention includes the steps of automatically restoring pressure to a depressured suspension system of a multi-axle vehicle responsive to the speed of the vehicle. Also included is the step of depressuring the repressured system within a given time of first depressuring if the speed of the vehicle is below a predetermined speed.

The automatic nature of the invention thus prevents the vehicle from resuming highway speed without the load being distributed properly on all axles. Additionally, within a predetermined time from first depressuring of one or more axle suspension systems, the invention permits subsequent automatic depressuring as the speed of the vehicle falls below a preset minimum without subsequent control input from the driver.

BRIEF DESCRIPTION OF THE DRAWINGS

Reference is now made to the drawings, in which.

DESCRIPTION OF THE PREFERRED EMBODIMENT

Figure 1:
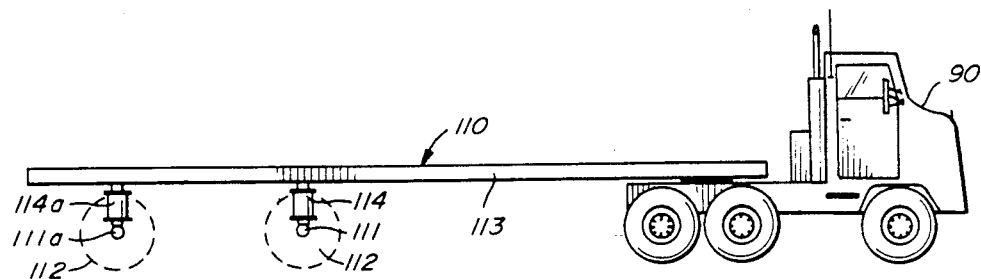
FIG. 1 is a side elevation view of a tractor and multi-axle trailer rig.

Referring now to FIG. 1, a tractor 90 is shown having a trailer generally designated by the numeral 110 attached thereto. Trailer 110 is a multi-axle trailer, and the trailer depicted in this figure incoudes two axles 111 and 111a with the tires 112 for each axle shown in relief. Interposed between axles 111 and 111a and the trailer bed 113 are the inflatable pneumatic suspension elements, or air bags 114 and 114a. Air bags 114 and 114a absorb the shock of traversing road irregularities and may be used alone as shock absorbers or in addition to other shock absorbing mechanisms. When air bags 114 and 114a are inflated they support the load on trailer bed 113 upon axles 111 and 111a. When pneumatic pressure is exhausted from air bags 114, the trailer bed load is removed from axle 111 attached to air bag 114.

Figure 2:
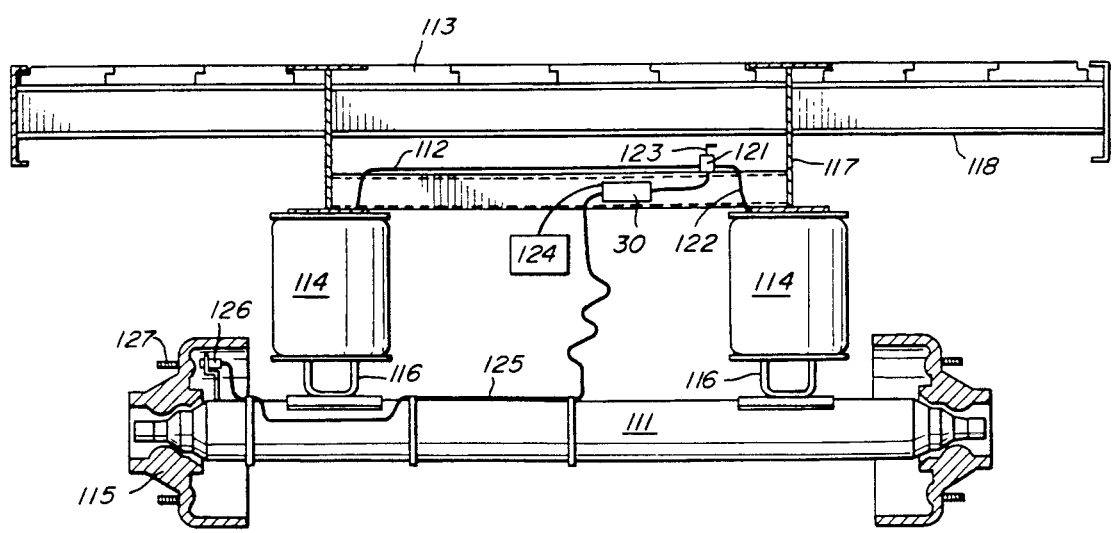
FIG. 2 is a rear elevation view in partial cross-section of the air bag suspension system of one axle on a multi-axle trailer.

Turning now to FIG. 2, axle 111 rides on tires and wheels (not shown) attached to the hub 115. Axle 111 supports air bags 114 on the lower air bag supports 116. At the upper end of air bags 114 is the beam 117 which in turn supports a trailer frame 118. Trailer frame 118 forms the supporting structure for trailer bed 113.

The pneumatic suspension provided by air bags 114 and 114a is determined by the air pressure supplied to those air bags from an air pump (not shown). In this example, the air pressure to air bags 114a is supplied continuously, while the air pressure to bags 114 is controllable by valve 121, an electrically actuated solenoid valve controlled from a cab switch (not shown). When valve 121 is open, air bags 114 are inflated through air supply lines 122 and then closed, thus providing support by axle 111 to trailer 113. When solenoid of valve 121 is powered from the cab switch, it activates air valve 121, allowing the air pressure in bags 114 to exhaust through lines 122 and air exhaust 123 of valve 121. In the instant invention, an electronic monitor 30 is inserted in series with the cab control switch ($S_1$ in FIG. 3) connected to power line 124, to prevent actuation of valve 121 in predetermined circumstances.

Electronic monitor 30 is also supplied with an electric pulse signal from lug sensor 126 through wire 125. Lug sensor 126 is an electromagnetic proximity sensor which generates an electric pulse in response to the passage of each hub lug 127 when the lug passes near lug sensor 126 as hub 115 rotates. The number of hub lugs 127 may vary for various makes of trailer hubs, but for purposes of illustration, it is common for trailer hubs 115 (and wheels associated therewith) to have ten such lugs radially disposed about hub 115. In this example, each ten pulses from sensor 126 would represent one wheel revolution.

Figure 3:
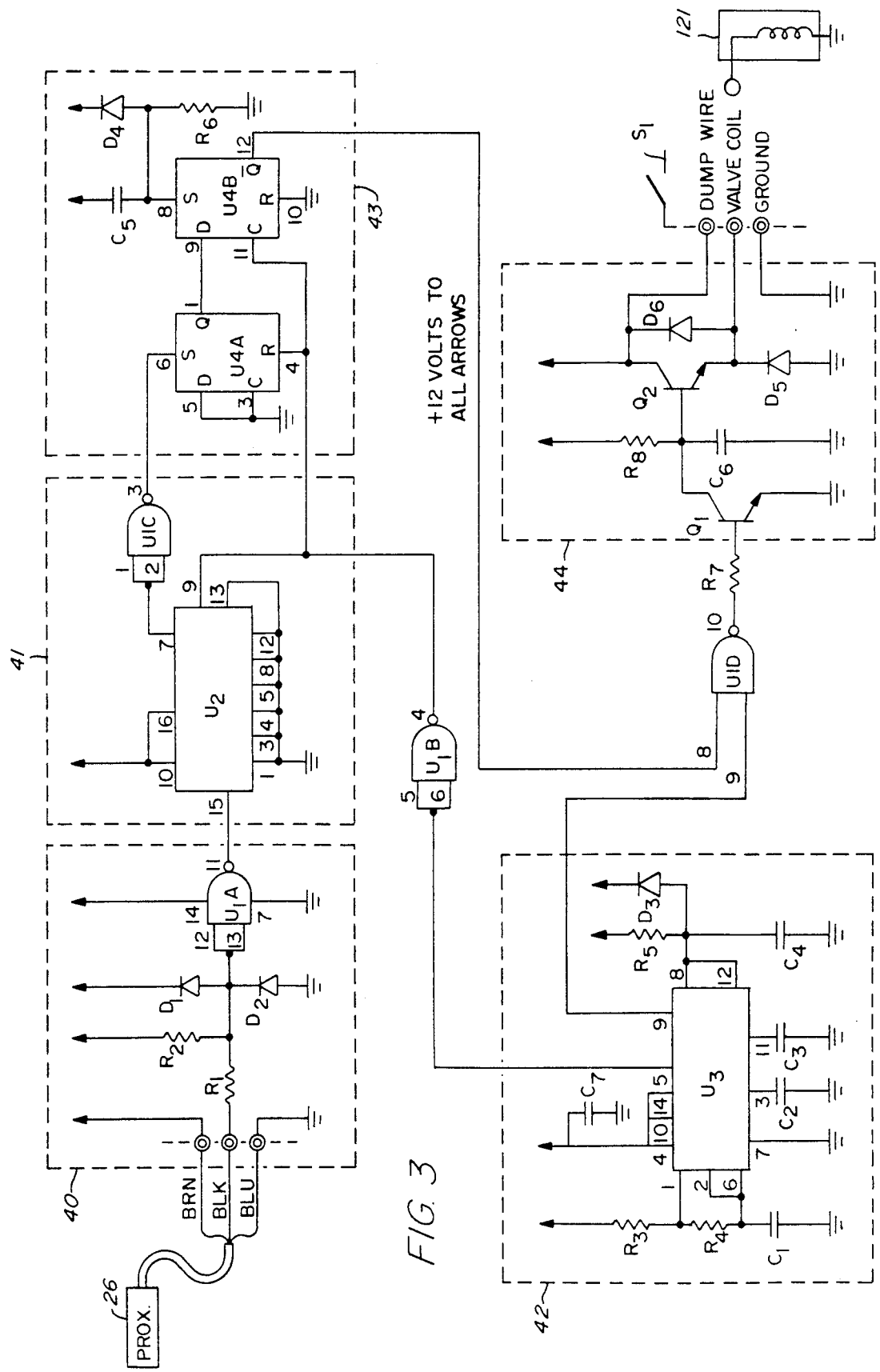
FIG. 3 is an electrical schematic layout of the electronic monitor for automatically restoring and exhausting pneumatic pressure to and from an axle suspension system.

The circuitry of electronic monitor 30 is shown in FIG. 3. Referring to FIG. 3, lug sensor 126 provides electrical pulses responsive to wheel rotation, which pulses are filtered and limited by a conventional filter limiter 40 which in turn, provides a single to a counter 41 responsive to wheel rotation. The timer 42 is a conventional dual timer which provides a first time output on the pin 5 through $U_1B$ to the pin 9 of counter 41 and to the pins 4 and 11 of a flip flop 43. Timer 42 is wired to provide an output signal to counter 41 and to flip flop 43 representative of a preset wneel speed, such as 5 mph. For example, it could provide to counter 41 a one millisecond signal each 2.28 seconds. Timer 42 also a second output signal on the line 9 to $U_1D$, one part of a Schmidt trigger NAND gate. In this example, signals received by counter 41 on input 15 are compared to those received on input 9, and an output signal on pin 7 is provided through $U_1C$ to flip flop 43 whenever wheel speed exceeds 5 mph. Flip flop 43 in turn, provides an output signal on line 12 to $U_1D$ whenever tire rotation speed exceeds, in this example, 5 mph.

Simultaneously, $U_1D$ receives the continuous five-minute signal from timer 42. If eaither the continuous five-minute signal is missing from input 9 of $U_1D$ or an overspeed signal is present on pin 8 of $U_1D$, then $U_1D$ provides an output on line 10 to the solenoid control circuit 44, which circuit inhibits the flow of current from the cab dump switch $S_1$ to solenoid control dump valve 121, thereby prohibiting the dumping of air from bags 114. However, if a signal is present on input 9 of $U_1D$ and an overspeed signal is not received on input 8 of $U_1D$, then no signal is present at pin 10 of $U_1D$, turning off $Q_1$ which , in turn. turns on $Q_2$, allowing current from $S_1$ to flow through $Q_2$ to solenoid 121, activating the solenoid and dumping air pressure from bags 114. Because the power to activate electronic monitor 30 is derived from cab dump switch $S_1$, timer 42 commences timing upon the closing of switch $S_1$, providing the continuous five-minute signal to $U_1D$ on input 9 only for five minutes after switch $S_1$ is closed. Should the five-minute signal time out, power is prevented by solenoid control 44 from reaching valve 121, and valve 121 releases, allowing pressure to return to bags 114. Only by resetting switch $S_1$ will timer 42 reset and commence timing again.

In operation on a highway, the trailer load is distributed by having proper supporting pressure in bags 114 and 114a for each axle 111 and 111a. In this way, the load per axle and tire wear are minimized and braking capacity is at a maximum. However, when a sharp turn must be negotiated by the driver, the equal load distribution between axles 111 and 111a can cause torque to trailer frame 118 because the traction of more than one axle-set of tires tends to prevent rotation of the trailer about a single point. When such a sharp turn is required, the driver slows to an appropriate speed, such as 3-5 miles per hour and actuates the control which causes valve 121 to open, thus exhausting pneumatic pressure from air bags 114 through air exhaust 123 for axle 111. When pneumatic pressure is exhausted from air bags 114, axle 111 no longer bears its share of the load of trailer 110 since that load has been shifted to the remaining axle. In this condition, trailer 110 can be maneuvered through tight turns, such as required when approaching a loading dock, and trailer frame torque and tire wear are minimized.

However, if the operator or driver should forget that the load has been shifted to only one axle 111a, and begins to increase speed, lug sensor 126 will detect the increase in trailer speed, and at a predetermined limit, such as 5 miles per hour, electronic monitor 30 will cause valve 121 to move from the open position to a position which redirects air into air bags 114, restores pneumatic pressure and closes valve 121. As long as the speed of the trailer 110 is above the speed of five miles per hour, valve 121 will remain closed, and pressure will be maintained in air bags 114. if the trailer is merely maneuvering in a loading area, rather than resuming highway speed, when the speed of the trailer falls below 5 miles per hour, lug sensor 126 detects the trailer speed less than 5 miles per hour, and electronic monitor 30 automatically opens valve 121, thereby again exhausting pneumatic pressure from air bags 114. So long as the time set on the electronic monitor 30 has not passed, each time the speed of the trailer 110 exceeds 5 miles per hour, the pressure to air bags 114 will be restored, and each time the speed falls below 5 miles per hour, the pressure in air bags 114 will be exhausted.

As alluded to above, the exhaustion and restoration of pressure to air bags 114 will continue for so long as a predetermined time has not passed (for example 5 minutes) from the time cab dump switch $S_1$ in the tractor is initially actuated. After that predetermined time, the exhausting position of valve 121 is overridden by timer 42, and pressure will not be exhausted through valve 121. This feature of the preferred embodiment will prevent inadvertent exhaustion of pneumatic pressure when the trailer has been stopped at a stop light or the like during highway travel.

Thus, it can be seen from the above description that a novel system for automatically controlling pneumatic suspension for multi-axle vehicles has been shown. The system works equally well for vehicles of two or more axles, and is particularly useful for commercial "widespread" trailers having a large distance between the sets of trailer axles. Although the preferred embodiment has described a trailer incorporating the invention, the invention may be used in other vehicles and no limitation is intended by such description. One skilled in the art can readily understand from this description that elements may be reversed and equivalent elements may be substituted and still derive the benefits of this invention.

What is claimed is:

1. In a process for shifting at least a portion of a vehicle load from one axle to another axle of a multi-axle vehicle having a pneumatic suspension system, the combination of steps comprising:
   exhausting substantially all the pneumatic pressure from the suspension system of at least one of said axles; and
   automatically restoring pneumatic pressure to said suspension system when the speed of the vehicle exceeds a predetermined speed.

2. The process as claimed in claim 1, including the step of:
   automatically exhausting substantially all said pneumatic pressure from said suspension system following said restoring step when the speed of the vehicle falls below a predetermined speed.

3. The process as claimed in claim 1, including the step of:

automatically restoring pneumatic pressure to said suspension system when a predetermined time has elapsed following said exhausting step irrespective of the speed of said vehicle.

4. The process as claimed in claim 1, including the step of:

automatically overriding a manual exhausting of said suspension system when said exhausting step is attempted if the speed of the vehicle is above a predetermined speed.

* * * * *